US009986026B2

(12) United States Patent
Shinohara

(10) Patent No.: US 9,986,026 B2
(45) Date of Patent: May 29, 2018

(54) NETWORK COMMUNICATION SYSTEM AND VIRTUALIZATION METHOD THEREOF

(71) Applicant: NEC Corporation, Tokyo (JP)

(72) Inventor: Yusuke Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 14/439,246

(22) PCT Filed: Oct. 31, 2013

(86) PCT No.: PCT/JP2013/006456
§ 371 (c)(1),
(2) Date: Apr. 29, 2015

(87) PCT Pub. No.: WO2014/068984
PCT Pub. Date: May 8, 2014

(65) Prior Publication Data
US 2015/0296008 A1    Oct. 15, 2015

(30) Foreign Application Priority Data

Oct. 31, 2012 (JP) ................................ 2012-241136

(51) Int. Cl.
G06F 15/173    (2006.01)
H04L 29/08    (2006.01)
(Continued)

(52) U.S. Cl.
CPC .......... *H04L 67/1031* (2013.01); *G06F 9/455* (2013.01); *H04L 41/5054* (2013.01);
(Continued)

(58) Field of Classification Search
CPC ......... H04L 45/42; H04L 47/70; H04L 67/16; H04L 45/125; H04L 41/5054; H04L 67/1031; H04L 45/306; G06F 9/455
(Continued)

(56) References Cited

U.S. PATENT DOCUMENTS 8,601,101 B1 * 12/2013 Singh ...................... H04L 69/40
370/254
8,756,298 B2 * 6/2014 Ma ...................... H04L 67/1008
709/203
(Continued)

FOREIGN PATENT DOCUMENTS

JP    2004-515156 A    5/2004
JP    WO 2014068984 A1 *   5/2014 ............. H04L 45/42
(Continued)

OTHER PUBLICATIONS

M. Koerner et al., "Multiple Service Load-Balancing with OpenFlow", High Performance Switching and Routing (HPSR), 2012 IEEE 13th International Conference on High Performance Switching and Routing, IEEE, pp. 210-214, Jun. 2012.
(Continued)

*Primary Examiner* — Anthony Mejia
(74) *Attorney, Agent, or Firm* — Finnegan, Henderson, Farabow, Garrett & Dunner, L.L.P.

(57) ABSTRACT

A network communication system and a virtualization method are provided that make it easy to increase/decrease traffic and to develop a network service. A communication system provided on a network boundary includes an edge network (100) including a plurality of nodes, a network control server (110) that can control the nodes in the edge network, and a service server pool (120) in which a plurality of service servers (SM1 to SM n) for respectively providing a plurality of network services are set, wherein the network control server sets a route between a predetermined node in
(Continued)

the edge network and each service server, corresponding to each of the plurality of network services.

8 Claims, 8 Drawing Sheets

(51) Int. Cl.
    *H04L 12/717*    (2013.01)
    *G06F 9/455*    (2018.01)
    *H04L 12/911*    (2013.01)
    *H04L 12/24*    (2006.01)
    *H04L 12/729*    (2013.01)
    *H04L 12/725*    (2013.01)

(52) U.S. Cl.
    CPC .............. *H04L 45/42* (2013.01); *H04L 47/70* (2013.01); *H04L 45/125* (2013.01); *H04L 45/306* (2013.01)

(58) Field of Classification Search
    USPC ........................................................ 709/226
    See application file for complete search history.

(56) References Cited

U.S. PATENT DOCUMENTS

| | | | |
|---|---|---|---|
| 8,949,389 B1* | 2/2015 | Rimmer | H04L 41/0866 370/230 |
| 2002/0087694 A1 | 7/2002 | Daoud et al. | |
| 2003/0058849 A1* | 3/2003 | Verbesselt | H04L 12/2859 370/386 |
| 2003/0065711 A1 | 4/2003 | Acharya et al. | |
| 2007/0104200 A1* | 5/2007 | Lai | H04L 45/00 370/392 |
| 2008/0244068 A1 | 10/2008 | Iyoda et al. | |
| 2009/0122697 A1* | 5/2009 | Madhyasha | H04L 41/12 370/229 |
| 2010/0303081 A1* | 12/2010 | Miyabe | H04L 45/18 370/400 |
| 2012/0113989 A1 | 5/2012 | Akiyoshi | |
| 2012/0151175 A1* | 6/2012 | Kim | G06F 12/0284 711/171 |
| 2012/0163224 A1* | 6/2012 | Long | H04L 41/5025 370/252 |
| 2013/0110939 A1* | 5/2013 | Yang | H04L 51/38 709/206 |
| 2013/0226856 A1* | 8/2013 | Zhang | G06N 7/005 706/52 |
| 2015/0072638 A1* | 3/2015 | Shaw | H04W 24/02 455/404.1 |

FOREIGN PATENT DOCUMENTS

| | | | | |
|---|---|---|---|---|
| WO | WO 2011/155484 A1 | 12/2011 | | |
| WO | WO 2012/101890 A1 | 8/2012 | | |
| WO | WO 2014068984 A1 * | 5/2014 | ............ | H04L 45/42 |

OTHER PUBLICATIONS

H. Shimonishi et al., "Virtualized network infrastructure using OpenFlow", Network Operations and Management Symposium Workshops (NOMS WKSPS), 2010 IEEE/IFIP, IEEE, pp. 74-79, Apr. 2010.

Extended European Search Report dated May 3, 2016 by the European Patent Office in counterpart European Patent Application No. 13851484.9.

International Search Report (ISR) (PCT Form PCT/ISA/210), in PCT/JP2013/006456, dated Feb. 4, 2014.

Okuda et al., "Delivering Sophisticated Broadband Access Switches," Fujitsu Access Review (Jan. 2004), vol. 13, No. 1.

Konomi Mochizuki, et al., "Proposal on a Scheme for VM Quick Migration for Dynamical Layout of Edge Functions," IEICE Technical Report vol. 112 No. 231, Oct. 2, 2012, pp. 107-112.

Chinese Office Action issued by the Chinese Patent Office in counterpart Chinese Patent Application No. 201380056919.6, dated Mar. 20, 2017.

* cited by examiner

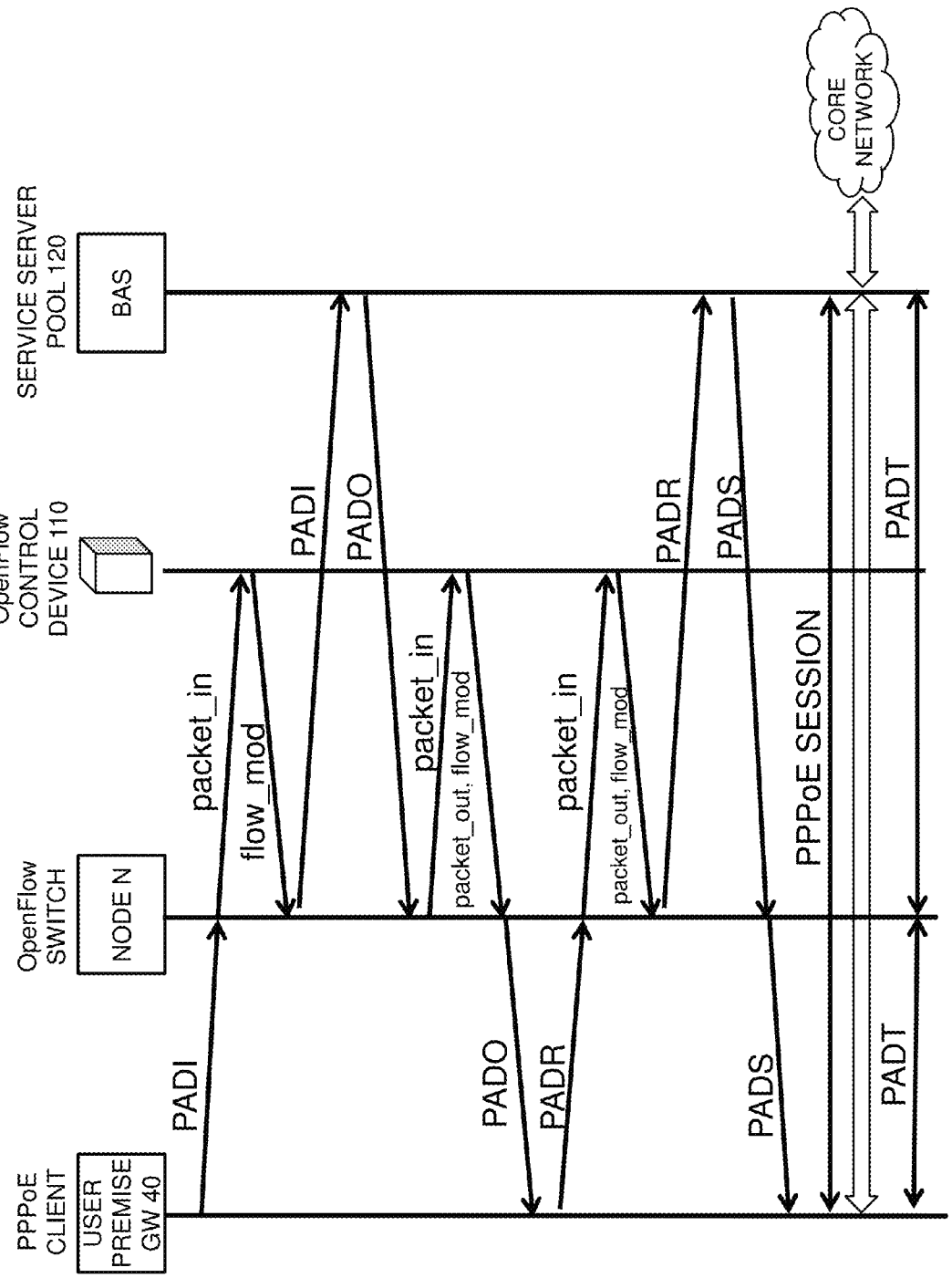

NETWORK COMMUNICATION SYSTEM AND VIRTUALIZATION METHOD THEREOF

TECHNICAL FIELD

The present invention relates to a communication system at a boundary between networks and, more particularly, to virtualization techniques for a communication system that includes service servers for providing various network services.

BACKGROUND ART

In recent years, various network services are provided over IP networks typified by the Internet, but a dedicated edge system is required for each network service. Note that the term "network service" used in the following description means a service that is provided at an edge to an IP network by a telecommunication carrier through ISP access, BRAS (Broadband Remote Access Server), BAS (Broadband Access Server), BNG (Broadband Network Gateway), SBC (Session Boarder Controller), SSE (Subscriber Service Edge), VoIP (Voice over IP) gateway, CDN (Content Delivery Network), IMS (IP Multimedia Subsystem), or the like.

For example, as shown in FIG. 1, a mobile system 1 including IMS for implementing VoIP and the like in addition to BSC (Base Station Controller), RNC (Radio Network Controller), and the like is provided as an edge system for a mobile communication network. SSE 2 including, for example, BAS and SBC is provided as an edge system for a fixed network.

FIG. 2 shows an example of an edge system that uses a BRAS as a LAC (L2TP Access Concentrator) (see FIG. 1 of NPL 1). An access network 3 and an ISP network 7 are connected through a BRAS 4, an IP network 5, and a LNS (L2TP Network Server) 6. A user terminal makes a request to the BRAS for session establishment, and upon successful authentication, the BRAS connects to the LNS (L2TP Network Server) based on L2TP (Layer 2 Tunneling Protocol), thereby enabling the ISP network 7 to provide a service to the user.

Moreover, PTL 1 has proposed a network access system that makes it possible to extend and modify services by, instead of using an inflexible and proprietary edge router, distributing the functionality of the edge router.

CITATION LIST

Patent Literature

[PTL 1] Japanese Patent Application Unexamined Publication No. 2004-515156

None Patent Literature

[NPL 1] Okuda et al., "Delivering Sophisticated Broadband Access Switches," FUJITSU ACCESS REVIEW (January 2004), Vol. 13, No. 1

SUMMARY

Technical Problem

However, in existing networks, since it is necessary to build a dedicated edge system for each network service, it is necessary to buy and prepare expensive dedicated devices for providing many various functions such as BRAS/BNG and SBC and further to set up them individually. Therefore, costs for capital investment and maintenance are increased, and it is impossible to flexibly respond to increases or decreases in traffic and new network services.

Accordingly, an object of the present invention is to provide a network communication system and a virtualization method for the same that make it easy to increase or decrease traffic and to develop network services.

Solution to Problem

A communication system according to the present invention is a communication system provided on a network boundary, characterized by comprising: a network including a plurality of nodes; network control means which can control the nodes in the network; and a service server pool in which a plurality of service servers for respectively providing a plurality of network services are set, wherein the network control means sets a route between a predetermined node in the network and each service server, corresponding to each of the plurality of network services.

A virtualization method according to the present invention is a virtualization method of a communication system provided on a network boundary, characterized by comprising: setting in a service server pool a plurality of service servers for respectively providing a plurality of network services; and by network control means for controlling a network including a plurality of nodes, setting a route between a predetermined node in the network and each service server, corresponding to each of the plurality of network services.

Advantageous Effects of Invention

According to the present invention, it is possible to provide a network communication system and a virtualization method for the same that make it easy to increase or decrease traffic and to develop network services.

BRIEF DESCRIPTION OF DRAWINGS

FIG. 8 is a sequence diagram showing a PPPoE discovery stage in the present example.

DETAILED DESCRIPTION

According to an exemplary embodiment of the present invention, a system is provided with a service server pool and a network control server, wherein the service server pool has service servers for respectively providing a plurality of network services (BRAS/BAS, SBC, IPTV, CDN, IMS, P-GW, S-GW, and the like) and the network control server controls a network. For an arbitrary network service, the network control server can determine a route to a service server that provides the network service, and can set the route on the network. Since the plurality of service servers can be managed at the service server pool and a route to a desired service server can be determined through the network, it is easy to set up/remove a service server and to respond to an increase or a decrease in traffic. Hereinafter, an exemplary embodiment and an example of the present invention will be described in detail with reference to drawings.

1. Exemplary Embodiment 1.1) Outline

Figure 1:
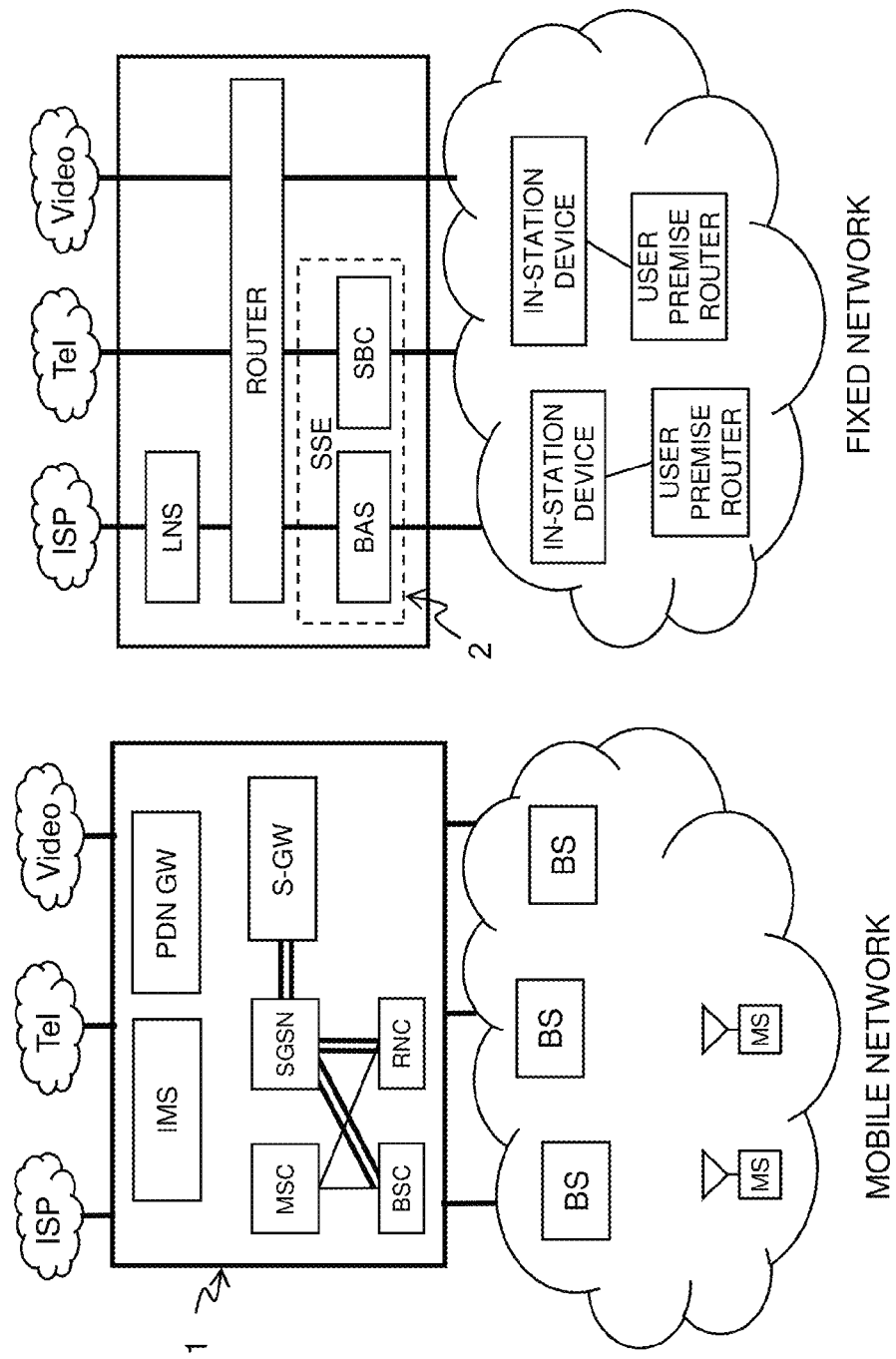
FIG. 1 is a network diagram showing an example of an existing edge system.
Figure 2:
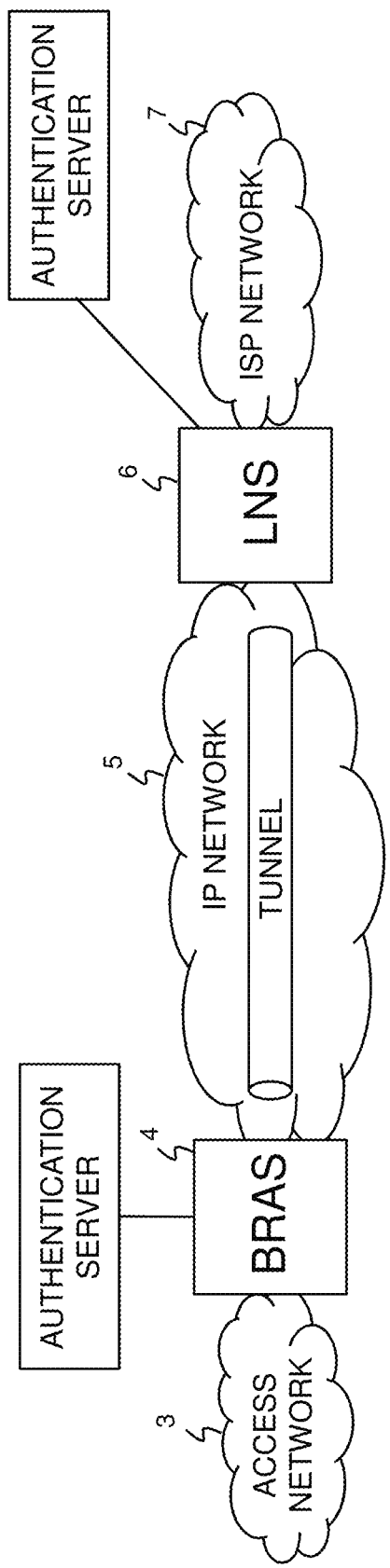
FIG. 2 is a network diagram showing an example of an edge system using BRAS.
Figure 3:
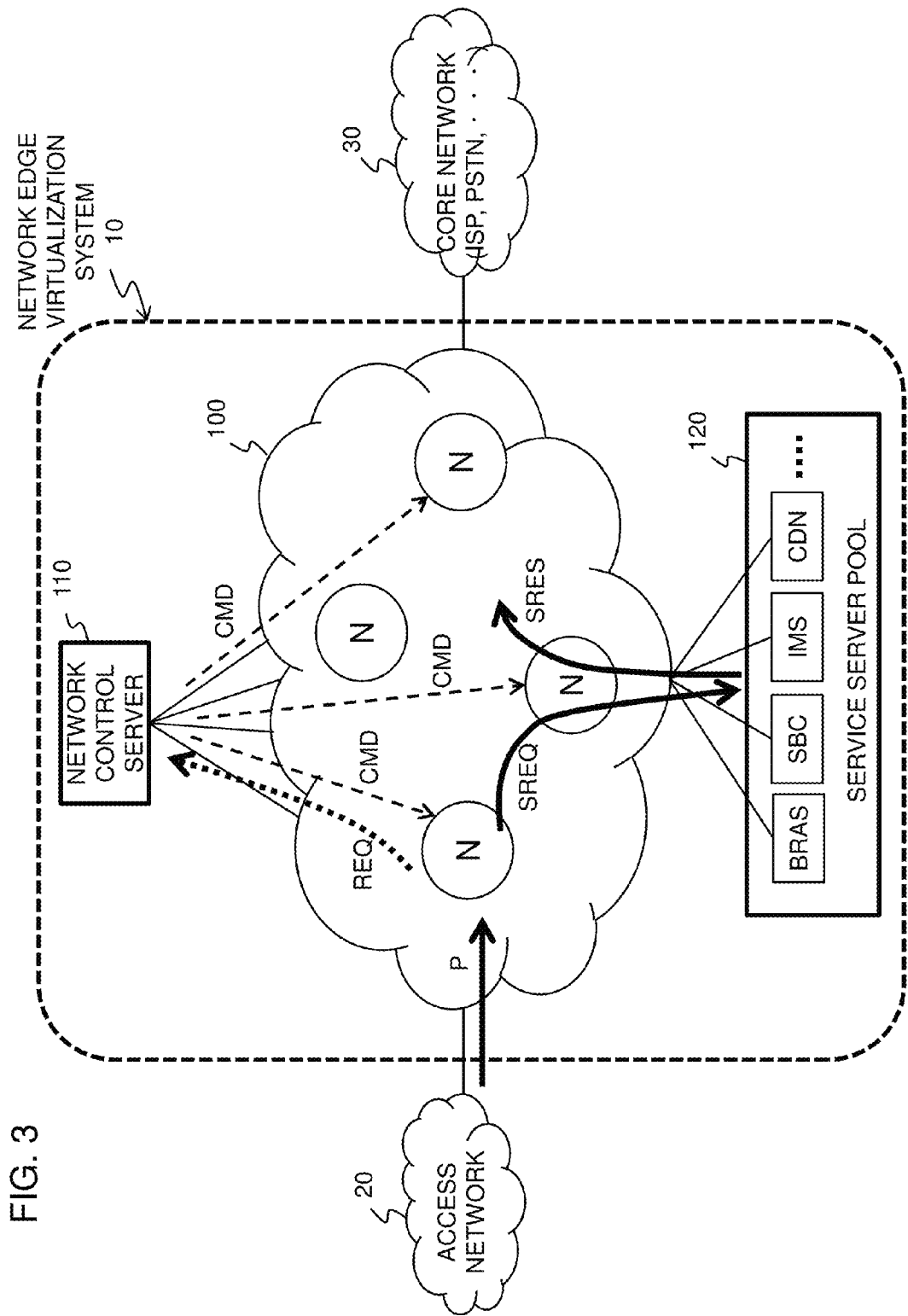
FIG. 3 is a network diagram schematically showing a network virtualization system according to an exemplary embodiment of the present invention.

Referring to FIG. 3, a network edge virtualization system 10 according to an exemplary embodiment of the present invention is provided at a boundary between an access network 20 and a core network 30 and comprises an edge network 100 including a plurality of nodes each labeled with "N", a network control server 110 that can control each node in the edge network 100, and a service server pool 120 having a plurality of service servers that respectively correspond to network services.

It is assumed that the network control server 110 has route setting information on the edge network 100, which is registered for each network service beforehand in a changeable manner by a system control server (not shown). Moreover, in the service server pool 120 as well, the plurality of predetermined service servers are assumed to be set up beforehand in a changeable manner by the system control server.

When a node N in the edge network 100 has received a session establishment request P regarding a network service via the access network 20, the node N sends a route resolution request REQ to the network control server 110. The network control server 110 performs setting on each relevant node so that routing to a service server corresponding to the network service of interest will be performed. Thus, the routing is performed taking into account the type of the service, whereby a request SREQ to process the request P is forwarded to the corresponding service server, and its processing response SRES is transmitted to the destination node via the edge network 100. Thereafter, communications are performed in accordance with existing protocols.

As described above, routing control is performed on the edge network 100 for each network service, whereby the plurality of service servers can be selectively session-connected, making it easy to manage the service servers. Moreover, if a plurality of servers is prepared for one type of service in the service server pool 120, the network control server 110 can adjust the balance of load between the service servers by changing service-dependent routes on the edge network 100 based on processing load information notified from each service server in the service server pool 120. Furthermore, since the system control server can manage each service server in the service server pool 120, it is easy to newly set up or remove a service server.

Hereinafter, a description will be given of the more detailed configuration and operation of the system 10 according to the present exemplary embodiment, with reference to FIGS. 4 and 5.

1.2) System Configuration

Figure 4:
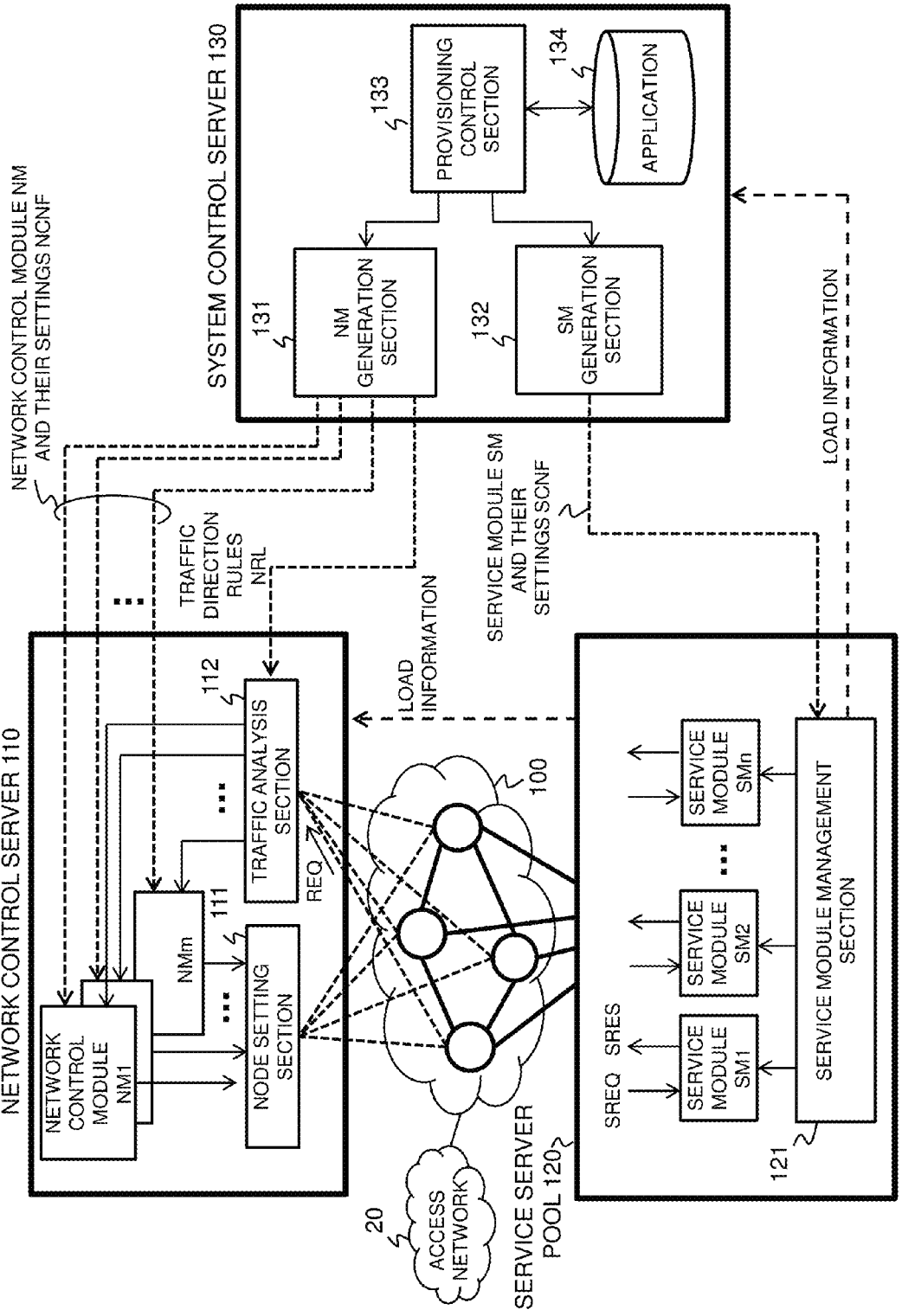
FIG. 4 is a block diagram more concretely showing the configuration of the network virtualization system according to the present exemplary embodiment.

Referring to FIG. 4, the network control server 110 includes a node setting section 111, a traffic analysis section 112, and a plurality of network control modules NM1 to NMm. The node setting section 111 performs setting of a relevant node or nodes in the edge network 100 so that routing computed by a selected network control module NM will be performed. The traffic analysis section 112, when receiving a route resolution request REQ from the edge network 100, analyzes traffic in accordance with traffic direction rules NRL set by the system control server 130 and selects a network control module to be in charge of processing. The network control modules NM1 to NMm are deployed in the network control server 110 along with network control module settings NCNF1 to NCNFm by the system control server 130, and a network control module selected by the traffic analysis section 112 performs routing computation and outputs its result to the node setting section 111.

The service server pool 120 includes a plurality of service modules SM1 to SMn and a service module management section 121 that manages them. Each of the service modules SM1 to SMn is an information processing device that functions as a service server based on a setting SCNF and, in response to a traffic processing request SREQ from the edge network 100, functions as the set service server to generate a traffic processing response SRES and transmit it to the edge network 100. The service module management section 121 sets service module settings SCNF1 to SCNFn received from the system control server 130 on a plurality of service modules.

The system control server 130 includes a network module generation section 131, a service module generation section 132, a provisioning control section 133, and an application storage section 134. The network module generation section 131, in accordance with control from the provisioning control section 133, generates the traffic direction rules NRL and the respective settings NCNF1 to NCNFm for the network control modules NM1 to NMm corresponding to service modules and transmits them to the network control server 110. The service module generation section 132, in accordance with control from the provisioning control section 133, generates the respective settings SCNF1 to SCNFn for the service modules SM1 to SMn and transmits them to the service server pool 120. The provisioning control section 133 reads out various service applications from the application storage section 134 and controls the network module generation section 131 and the service module generation section 132.

1.3) Operation

Figure 5:
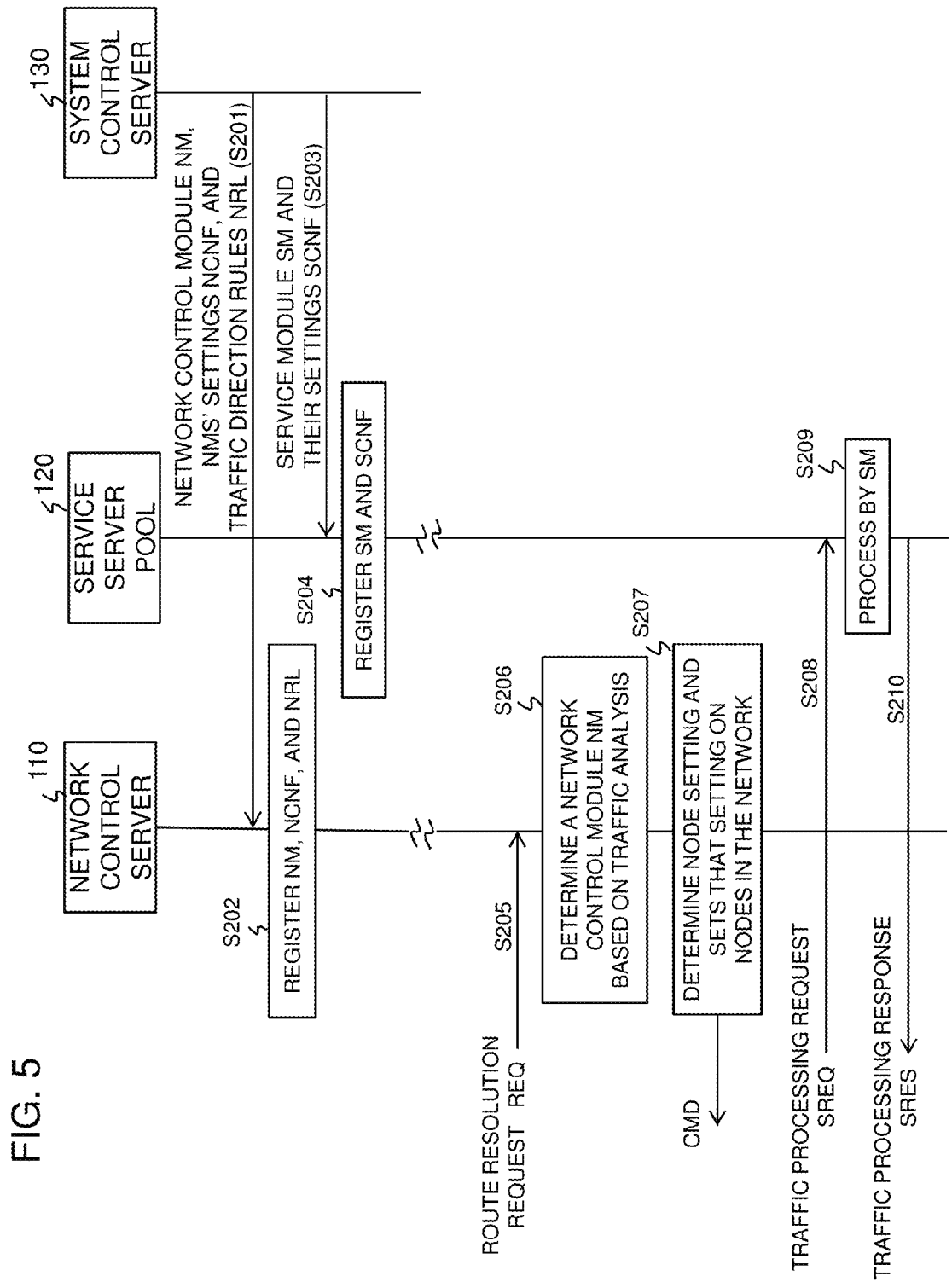
FIG. 5 is a sequence diagram showing the entire operation of the system shown in FIG. 4.

Referring to FIG. 5, the system control server 130 transmits setting information and the traffic direction rules NRL to the network control server 110, the setting information including network control module NM and the respective settings NCNF1 to NCNFm for the network control modules NM1-NMm corresponding to service modules (operation S201). The network control server 110 registers the setting information and the traffic direction rules NRL in the plurality of network control modules NM1 to NMm and the traffic analysis section 112, respectively (operation S202). Moreover, the system control server 130 transmits the respective settings SCNF1 to SCNFn for the service modules SM1 to SMn to the service server pool 120 (operation S203), and the service server pool 120 registers these setting information in the plurality of service modules SM1 to SMn, respectively (operation S204).

When the network control server 110 receives a route resolution request REQ from the edge network 100 after the above-described registrations are completed (operation S205), the network control server 110 analyzes traffic in accordance with the traffic direction rules NRL and determines a network control module to be in charge of processing (operation S206). Subsequently, the network control server 110 sets the setting NCNF for the determined network control module NM on a node or nodes in the edge network 100 (operation S207). Subsequently, when a service server SM in the service server pool 120 receives a traffic processing request SREQ from the edge network 100 (operation S208), the service server SM executes this processing to generate a traffic processing response SRES (operation S209) and transmits it to the edge network 100 (operation S210).

1.4) Balance of Load

It is also possible that the service module management section 121 periodically monitors the load status of each service module and notifies load information to the network control server 110 and the system control server 130. In this case, the network control server 110 can change a corresponding setting NCNF based on the load information so that the balance of load will be adjusted between service modules in the service server pool 120. For example, when the load on a certain service module has increased, the setting of the network control module is changed so that a new traffic processing request SREQ will be routed to another service module that is capable of processing the same service.

Moreover, it is also possible that when a processing load has decreased and the ratio of idle time of a service module in question has become high to a certain degree, then the provisioning control section 133 of the system control server 130 controls the network module generation section 131 and the service module generation section 132 so that this service module will be removed. Conversely, it is also possible that when a new service is set or when a processing load has increased to a certain level or higher, the provisioning control section 133 controls the network module generation section 131 and the service module generation section 132 so that a network module is newly set up.

1.5) Effects

As described above, according to the present exemplary embodiment, routing control is performed on the edge network 100 for each service, whereby a plurality of service servers can be selectively session-connected, making it easy to manage the service servers.

Moreover, the service server pool 120 notifies the load status of each service module to the network control server 110 and the system control server 130, whereby load adjustment can be performed by the network control server 110 in the short term and by the system control server 130 in the long term when a difference in load between service servers in the service server pool 120 has increased, or when a large load is imposed on a service server.

2. Example

The edge virtualization system 10 according to the above-described exemplary embodiment can be applied to an OpenFlow network system. Hereinafter, blocks that have the same functions as those blocks shown in FIG. 4 are denoted by the same reference signs as in FIG. 4, and a description thereof will be simplified in an example of application to an OpenFlow network including a plurality of OpenFlow switches (nodes N).

Figure 6:
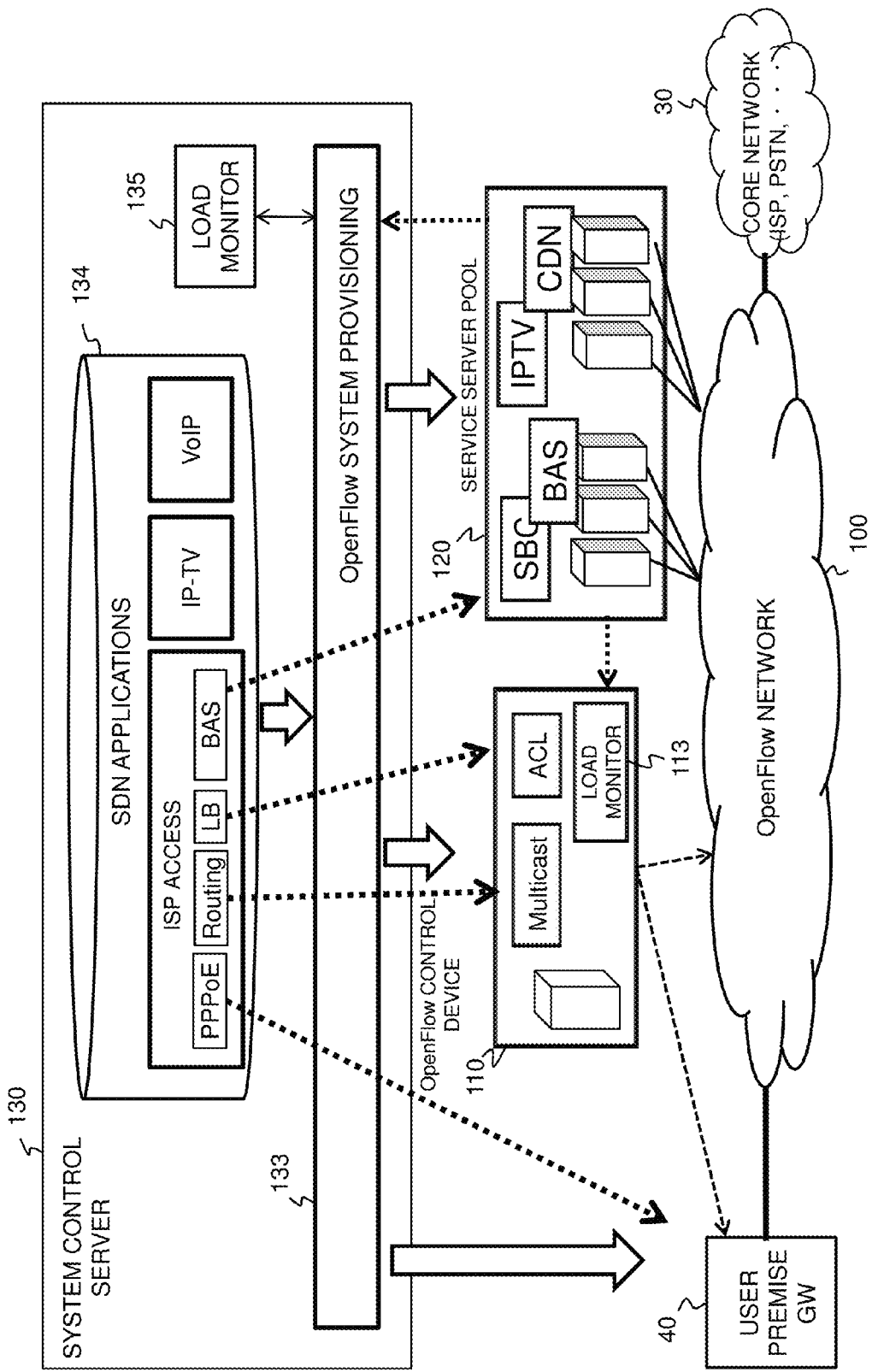
FIG. 6 is a schematic diagram for describing a functional configuration of a network virtualization system according to an example of the present invention.

Referring to FIG. 6, a user premise gateway 40 and each OpenFlow switch in an OpenFlow network 100 are controlled by an OpenFlow control device 110. A system control server 130 performs system provisioning of the user premise gateway 40 and the OpenFlow control device 110. Moreover, the system control server 130 similarly provisions a service server pool 120 with service servers such as BAS, SBC, IPTV, and CDN. Note that the OpenFlow control device 110 and the system control server 130 are provided with load monitors 113 and 135, respectively, for monitoring the load on each service server in the service server pool 120 and can perform load adjustment as described above.

Hereinafter, a description will be given of a discovery stage before a PPP session is established between the user premise GW 40 and a BAS in the service server pool 120 via the OpenFlow network 100 based on the PPPoE (PPP over Ethernet) protocol (Ethernet is a trademark, and the same will apply hereinafter). Note that a network control module NM for controlling PPPoE traffic is assumed to be already deployed in the OpenFlow control device 110.

Figure 7:
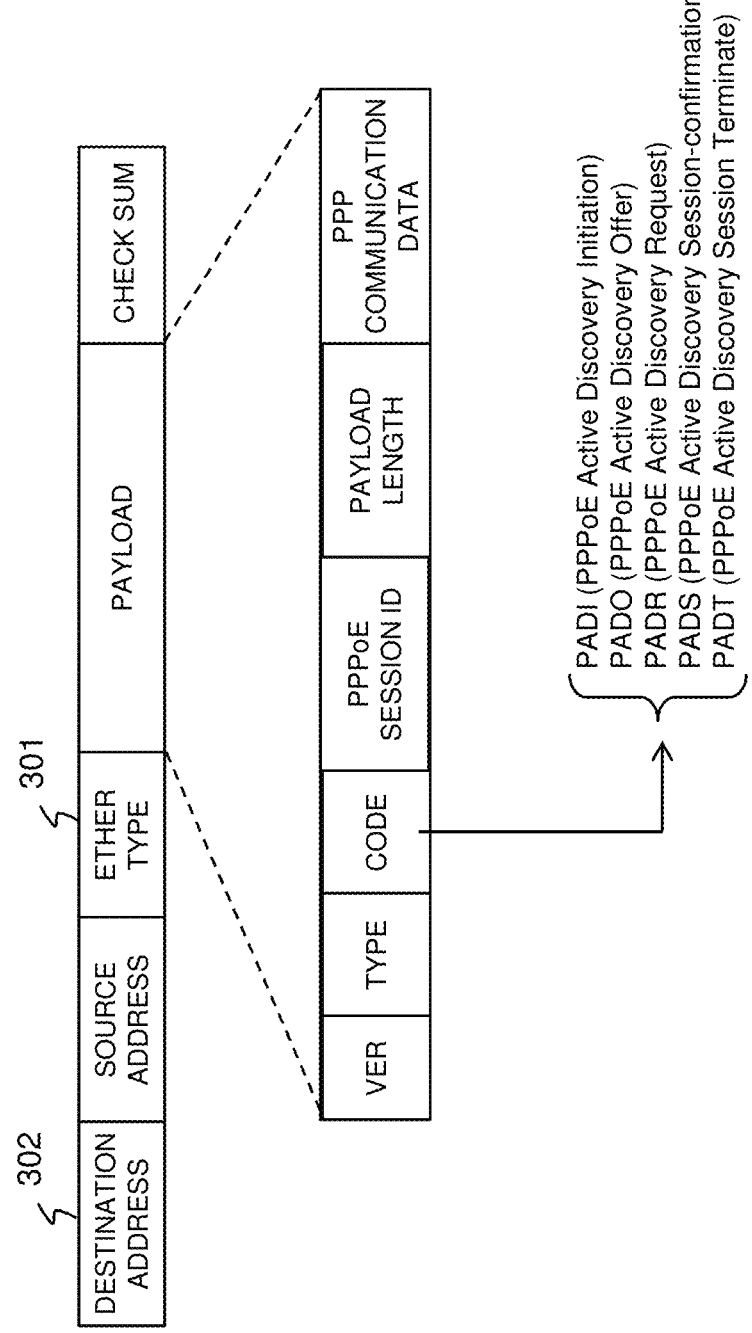
FIG. 7 is a format diagram of a PPPoE packet used in the present example.

Referring to FIG. 7, an Ether type (ETHER_TYPE) 301 is designated in the header of a PPPoE packet, showing a PPPoE discovery stage or a PPP session stage. The Ether types 301 for the PPPoE discovery stage and the PPP session stage are 0x8863 and 0x8864, respectively, based on which a traffic analysis section 112 of the network control server 110 can direct traffic to the network control module NM for controlling PPPoE traffic.

In the PPPoE discovery stage shown in FIG. 8, the client (gateway 40) transmits a PADI (PPPoE Active Discovery Initiation) packet as a broadcast packet out to the OpenFlow network 100, thereby making a session establishment request. An OpenFlow switch (node N) that has received the PADI packet notifies an input of the packet to the OpenFlow control device 110 by using a packet_in message (route resolution request). In response to it, the OpenFlow control device 110 requests to register this flow by using a flow_mod message (node setting). To accomplish this operation, the traffic analysis section 112 of the OpenFlow control device 110 checks the packet_in and, since the Ether type is 0x8863, transfers this packet_in to the network control module NM for controlling PPPoE traffic. Here, the destination address of the PADI packet is "dest mac=ff:ff:ff:ff:ff:ff", and the network control module NM for controlling PPPoE traffic that has received the packet_in determines a service server to process a session of interest from among service servers functioning as BAS in the service server pool 120, resolves a route between the client (gateway 40) and this service server, and transfers the resolved route to a node setting section 111. The node setting section 111 requests nodes along this route to set the forwarding destination of packets belonging to this flow by using a flow_mod message. Thus, the PADI packet is forwarded to the BAS server in the service server pool 120 via the OpenFlow network 100. Note that a network control module to be the transfer destination is determined based on the Ether type, the source TCP port number, and the destination TCP port number, while in the determination of a BAS, it is determined only based on the Ether type, and any numbers may be set for the source and destination TCP port numbers.

When receiving the PADI packet from the client, the BAS server transmits a PADO (PPPoE Active Discovery Offer) packet out to the OpenFlow network 100. The OpenFlow switch that has received the PADO packet notifies an input of the packet to the OpenFlow control device 110 by using a packet_in message. When receiving flow_mod and packet_out messages from the OpenFlow control device 110 in response to it, the OpenFlow switch transmits the PADO packet to the client. To accomplish this operation, the traffic analysis section 112 of the OpenFlow control device 110 checks the packet_in and, since the Ether type is 0x8863, transfers this packet_in to the network control module NM for controlling PPPoE traffic. Here, the destination address of the PADO packet is the client (gateway 40), and the network control module NM for controlling PPPoE traffic that has received the packet_in resolves a route between the BAS server and the client (gateway 40) and transfers the resolved route to the node setting section 111. The node setting section 111 requests nodes along this route to set the forwarding destination of packets belonging to this flow by using a flow_mod message. Note that in this case, it is also possible to delete/change the flow entry by using a flow_mod message.

When receiving the PADO packet from the BAS server, the client transmits a PADR (PPPoE Active Discovery Request) packet out to the OpenFlow network 100. The OpenFlow switch that has received the PADR packet notifies an input of the packet to the OpenFlow control device 110 by using a packet_in message. When receiving flow_mod and packet_out messages from the OpenFlow control device 110 in response to it, the OpenFlow switch transmits the PADR packet to the BAS server in the service server pool 120 via the OpenFlow network 100. To accomplish this operation, the traffic analysis section 112 of the OpenFlow control device 110 checks the packet_in and, since the Ether type is 0x8863, transfers this packet_in to the network control module NM for controlling PPPoE traffic. Here, the destination address of the PADR packet is the BAS server that controls the session with the client, and the network control module NM for controlling PPPoE traffic that has received the packet_in resolves a route between the client (gateway 40) and the BAS server and transfers the resolved route to the node setting section 111. The node setting section 111 requests nodes along this route to set the forwarding destination of packets belonging to this flow by using a flow_mod message. Note that in this case, it is also possible to delete/change the flow entry by using a flow_mod message.

When receiving the PADR packet, the BAS server transmits a PADS (PPPoE Active Discovery Session-confirmation) packet to the client via the OpenFlow network 100, whereby a PPPoE session has been established.

As in the above-described PPPoE discovery stage (Ether type 0x8863), a session in the PPP session stage (Ether type 0x8864) is established. Thus, ordinary data communications are performed between the client and the BAS server.

To terminate the session, the client or the BAS server transmits a PADT (PPPoE Active Discovery Session Terminate) packet in the PPPoE discovery stage (Ether type 0x8863) to the BAS server or the client. The BAS server or the client that has received the packet terminates the PPPoE session.

INDUSTRIAL APPLICABILITY

The present invention is applicable to an edge system for obtaining a plurality of network services.

REFERENCE SIGNS LIST

10 Network edge virtualization system
20 Access network
30 Core network
40 User premise gateway
100 Edge network
110 Network control server
111 Node setting section
112 Traffic analysis section
120 Service server pool
121 Service module management section
130 System control server
131 Network control module generation section
132 Service module generation section
133 Provisioning control section
134 Application storage section

The invention claimed is:

1. A communication system, comprising:
an edge network connected to an access network and a core network;
a network controller controlling a node of the edge network;
a service server pool connected to the edge network, wherein the service server pool includes a plurality of information processing devices, wherein each of information processing devices is configured to function as a service server to provide one of a plurality of network services; and
a system controller that provisions the network controller with route-setting information corresponding to each of the plurality of network services, and that provisions the service server pool with network-service-setting information for each network service,
wherein the network controller controls a packet forwarding route to one of service servers in the edge network according to the route-setting information for the plurality of network services,
wherein the network controller, when receiving a request for a network service from the edge network, controls the edge network by using the route-setting information to set a route to a service server corresponding to the requested network service,
wherein the system controller is further configured to at least one of add, delete, or change network-service-setting information provided to the service server pool based on load statuses of the service servers in the service server pool.

2. The communication system according to claim 1, wherein the network controller changes the route, depending on load statuses of the service servers in the service server pool.

3. The communication system according to claim 1, wherein after a route corresponding to a network service has been set, a packet input to the predetermined node is forwarded to a service server corresponding to the network service that this packet is requesting, through the route corresponding to the network service.

4. A virtualization method of a communication system provided on a network boundary, comprising:
by a setting controller, setting in a service server pool a plurality of service servers for respectively providing a plurality of network services; and
by a network controller that controls a network including a plurality of nodes, setting a route between a predetermined node in the network and each service server, corresponding to each of the plurality of network services; and
by a system controller,
provisioning the network controller with route-setting information corresponding to each of the plurality of network services;
provisioning the service server pool with network-service-setting information for each network service; and
at least one of adding, deleting, or changing the network-service-setting information provided to the service server pool based on load statuses of the service servers in the service server pool.

5. The virtualization method according to claim 4, wherein the network controller changes the route, depending on load statuses of the service servers in the service server pool.

6. The virtualization method according to claim 4, wherein after a route corresponding to a network service has been set, a packet input to the predetermined node is forwarded to a service server corresponding to the network service that this packet is requesting, through the route corresponding to the network service.

7. A service server pool in a communication system, wherein the communication system includes a network controller and an edge network connected to an access network and a core network, and the service server pool and the network controller are connected to the edge network, the service server pool comprising:
  a plurality of service modules configured to be service servers to provide a plurality of network services; and
  a controller configured to control the plurality of service modules to:
    send load status of the plurality of service modules to a system control server of the communication system; and
    in accordance with network-service-setting information from the system control server, add, delete, or change server functions of the plurality of service modules,
  wherein when a service module receives a request for a network service from the edge network through a route set by the network controller, the service module sends a response back to the edge network.

8. A system control server controlling a network control server which controls an edge network connected to an access network and a core network and controlling a service server pool including a plurality of service servers providing a plurality of network services, wherein the network control server and the service server pool are connected to the edge network, the system control server comprising:
  a first controller configured to provide the network control server with route-setting information for the plurality of network services; and
  a second controller configured to provide the service server pool with network-service-setting information for the plurality of network services,
  wherein the network control server controls a packet forwarding route to one of service servers in the edge network according to route-setting information for the plurality of network services,
  wherein the network control server, when receiving a request for a network service from the edge network, controls the edge network by using the route-setting information, to set a route to a service server corresponding to the requested network service, and
  wherein the second controller is further configured to at least one of add, delete, or change the network-service-setting information provided to the service server pool based on load statuses of the service servers in the service server pool.

* * * * *